United States Patent
Fachar et al.

(10) Patent No.: US 8,408,912 B2
(45) Date of Patent: Apr. 2, 2013

(54) COMPUTERIZED TESTING SYSTEM FOR EVALUATING SKILLS OF FORMATTED PRODUCT PRODUCERS AND METHODS USEFUL IN CONJUNCTION THEREWITH

(75) Inventors: Michael Watkins Fachar, Herzliya (IL); Arik Filstein, Herzliya (IL)

(73) Assignee: Jobookit Technologies Ltd., Raanana (IL)

( * ) Notice: Subject to any disclaimer, the term of this patent is extended or adjusted under 35 U.S.C. 154(b) by 825 days.

(21) Appl. No.: 12/498,069

(22) Filed: Jul. 6, 2009

(65) Prior Publication Data

US 2011/0003272 A1    Jan. 6, 2011

(51) Int. Cl.
*G09B 7/00* (2006.01)
(52) U.S. Cl. .................................................... 434/118
(58) Field of Classification Search .................. 434/118, 434/323
See application file for complete search history.

(56) References Cited

U.S. PATENT DOCUMENTS

| | | | | |
|---|---|---|---|---|
| 4,622,013 | A * | 11/1986 | Cerchio | 434/118 |
| 5,259,766 | A * | 11/1993 | Sack et al. | 434/362 |
| 5,697,788 | A * | 12/1997 | Ohta | 434/118 |
| 2002/0132656 | A1* | 9/2002 | Lydon et al. | 463/9 |
| 2003/0138759 | A1* | 7/2003 | Rowley et al. | 434/219 |
| 2004/0259060 | A1* | 12/2004 | Kumar et al. | 434/118 |
| 2008/0155508 | A1* | 6/2008 | Sarkar et al. | 717/126 |

* cited by examiner

*Primary Examiner* — Kathleen Mosser
(74) *Attorney, Agent, or Firm* — Oliff & Berridge, PLC

(57) ABSTRACT

A computerized testing system for evaluating skills of formatted product producers, the system comprising a buggy formatted product generator operative to introduce at least one formatting mistake into a formatted product thereby to generate a buggy formatted product and to generate and display on a computer screen to an applicant user, a representation of the buggy formatted product a debugging interface operative to provide a platform enabling the applicant user to attempt to correct the at least one formatting mistake, and an applicant user monitor operative to monitor the debugging interface and to provide to an applicant evaluating user, at least one output characterizing the applicants attempt to correct at least one formatting mistake.

19 Claims, 14 Drawing Sheets

---

⊠ Oops, the generated output did not match the requirements. Try again

★ Current Score 89/100

? Level 3

Correct the code below so for any given numeric argument it will print the Fibonacci series of that argument Skip this question

```
using System;
using System.Reflection;
using System.Runtime.InteropServices;

public class MainClass
{
    public static void Main(string[ ] argv) {
        int n = int.Parse(argv[0]) ;
        for (int x = 1 ; x <= n ; ++x) {
            Console.WriteLine (Fibonacci (x) ) ;
        }
    }
    static int Fibonacci (int x)
    {
        if (x <= 1)
            return 1;
        return Fibonacci (x-1) + Fobonacci (x-2) ;
    }
}
```

⊙ Compile
↻ Reset Code

Fig. 5

Current Score 89/100

Level 3

Correct the code below so for any given numeric argument it will print the Fibonacci series of that argument Skip this question Oops, the generated output did not match the requirements. Try again

```
using System;
using System.Reflection;
using System.Runtime.InteropServices;

public class MainClass
{
    public static void Main(string[ ] argv) {
        int n = int.Parse(argv[0]);
        for (int x = 1 ; x <= n ; ++x) {
            Console.WriteLine (Fibonacci (x)) ;
        }
    } static int Fibonacci (int x)
    {
        if (x <= 1)
            return 1;
        return Fibonacci (x-1) + Fobonacci (x-2) ;
    }
}
```

Compile
Reset Code

Fig. 6

✓ Congratulations ! The code produced the expected result.

using System;
using System.Reflection;
using System.Runtime.InteropServices;

public class MainClass
{
    public static void Main(string[] argv) {
        int n = int.Parse(argv[0]);
        for (int x = 1; x <= n; x++) {
            Console.WriteLine (Fibonacci (x) );
        }
    }
    static int Fibonacci (int x)
    {
        if (x <= 1)
            return 1;
        return Fibonacci (x-1) + Fobonacci (x-2) ;
    }
}

★ Current Score 89/100

② Level 3

Correct the code below so for any given numeric argument it will print the Fibonacci series of that argument Skip this question ✓ Continue

| Table: answer_stats Field name | Description |
|---|---|
| Userid | User identifier |
| Subject | Test type (csharp, c, c++) |
| Difficulty | Test level |
| Id | |
| attempt_num | Number of attempts to solve the problem |
| Mousedistance | Distance of mouse pointer from the task itself |
| Avgmousespeed | Average mouse speed |
| Backspaces | Number of backspace clicks |
| Msfirstclick | Number of mouse clicks |
| Msfirstkey | Number of key clicks |
| Avgstrokesmin | |
| Numwarnings | Number of warnings received from compiler |
| Totaltime | Total time for solution |

Fig. 7A

| Table: quiz_mc Field name | Description |
|---|---|
| Subject | User identifier |
| Difficulty | Test type (csharp, c, c++) |
| Id | Test level |
| Question | |
| answer1 | Number of attempts to solve the problem |
| answer2 | Distance of mouse pointer from the task itself |
| answer3 | Average mouse speed |
| answer4 | Number of backspace clicks |
| correct_answer | Number of mouse clicks |
| Numwarnings | Number of warnings received from compiler |
| Totaltime | Total time for solution |

Fig. 7B

| Table: quiz_prog Field name | Description |
|---|---|
| Subject | Type of the question |
| Difficulty | Question level |
| Id | |
| base_code | Question itself. Actually it keeps the base right code. |
| Hardness | |
| unaskable | Flag if the question could be used |

Fig. 7C

| Table: quiz_prog_qdesc Field name | Description |
|---|---|
| Id | |
| Qname | Name of the question |
| no_input_desc | Description for non-inout types of question |
| fix_desc | Description for fixed type of the questions |
| write_desc | Description for the tasks, require writing code |
| test_arg1 | Tasks functions argument |
| test_arg2 | Tasks functions argument |
| test_arg3 | Tasks functions argument |
| test_arg4 | Tasks functions argument |
| test_arg5 | Tasks functions argument |
| test_input | Test input |
| expected_output | Expected output |

Fig. 7D

| Table: scrambler_assign Field name | Description |
|---|---|
| Assignid | |
| Subject | Task type |
| Difficulty | Difficulty level of task |
| Id | |
| scrambler_grp_from | Rule of scrambling |
| scrambler_grp_to | Rule of scrambling |
| Hardness | Non relevant now |
| max_uses | Maximum number using this rule |

Fig. 7E

| Table: scrambler_grp_from Field name | Description |
|---|---|
| from_grp_name | Group name |
| expr_type | Expression types (s –string, w – word expression, W – whitespaces, e - exception) |
| Expression | Expressions (like ((, [] < > ==) |

Fig. 7F

| Table: scrambler_grp_to Field name | Description |
|---|---|
| to_grp_name | Group name |
| replacement_text | Replacement text |

Fig. 7G

| Table: user_state Field name | Description |
|---|---|
| Userid | User identificator |
| Subject | Test identificator |
| Difficulty | Current difficulty |
| Id | |
| ask_date | Started time |
| answer_date | Time of solution |
| skip_date | Time of skipping question |
| Result | Result of the test (failed/ok) |
| Score | Score of the test |
| num_tries | Number of compilations |

Fig. 7H

| Subject | Csharp |
|---|---|
| Difficulty | 1 |
| Id | 10 |
| Base_code | Using System;<br>using System.Collections.Generic;<br>using System.Text;<br><br>class Program<br>{<br>  static void Main(string[] args) {<br>    for (int i = 1 ; i <= 100 ; i++)<br>      if ((i & 0x00000001) != 0) {<br>        Console.Write(i);<br>        Console.Write(", ");<br>      }<br>    }<br>}|
| Unaskable | false |

Fig. 9

| Frm_group_name | Comparison |
|---|---|
| Expr_type | W |
| Expression | = |

Fig. 10

| to_group_name | Comparison |
|---|---|
| Replacement_text | > |

Fig. 11

| Id | 1 |
|---|---|
| Qname | Prime |
| No_input_desc | Please, check syntaxis and correct the errors |
| Fix_desc | |
| Write_desc | |
| ........ | |

Fig. 12

| Assigned | 1 |
|---|---|
| Subgect | Csharp |
| Difficulty | 1 |
| id | 1 |
| Scrambler_group_from | Comparison |
| Scrambler_group_to | Comparison |
| Max_uses | 3 |

Fig. 13

```
Using System;
using System.Collections.Generic;
using System.Text;

class Program
{
  static void Main(string[] args) {
    for (int i > 1 ; i <> 100 ; i++)
      if ((i & 0x00000001) != 0) {
        Console.Write(i);
        Console.Write(", ");
      }
  }
}
```

```
<category>
  <tries>7</tries>
  <layout>Programming.aspx</layout>

<level1>
    <mousedistance>500</mousedistance>
    <avgmousespeed>2</avgmousespeed>
    <backspaces>25</backspaces>
    <msfirstclick>15000</msfirstclick>
    <msfirstkey>20000</msfirstkey>
    <avgstrokesmin>60</avgstrokesmin>
    <numwarnings>1</numwarnings>
    <totaltime>120</totaltime>
  </level1>
  <level2>
    <mousedistance>1000</mousedistance>
    <avgmousespeed>3</avgmousespeed>
    <backspaces>35</backspaces>
    <msfirstclick>20000</msfirstclick>
    <msfirstkey>30000</msfirstkey>
    <avgstrokesmin>120</avgstrokesmin>
    <numwarnings>1</numwarnings>
    <totaltime>180</totaltime>
  </level2>
  <level3>
    <mousedistance>4000</mousedistance>
    <avgmousespeed>4</avgmousespeed>
    <backspaces>35</backspaces>
    <msfirstclick>30000</msfirstclick>
    <msfirstkey>40000</msfirstkey>
    <avgstrokesmin>180</avgstrokesmin>
    <numwarnings>2</numwarnings>
    <totaltime>300</totaltime>
  </level3>
```

FIG. 15B

```
<level4>
   <mousedistance>8000</mousedistance>
   <avgmousespeed>7</avgmousespeed>
   <backspaces>40</backspaces>
   <msfirstclick>30000</msfirstclick>
   <msfirstkey>40000</msfirstkey>
   <avgstrokesmin>300</avgstrokesmin>
   <numwarnings>2</numwarnings>
   <totaltime>420</totaltime>
</level4>
<level5>
   <mousedistance>10000</mousedistance>
   <avgmousespeed>9</avgmousespeed>
   <backspaces>30</backspaces>
   <msfirstclick>30000</msfirstclick>
   <msfirstkey>30000</msfirstkey>
   <avgstrokesmin>500</avgstrokesmin>
   <numwarnings>1</numwarnings>
   <totaltime>600</totaltime>
</level5>
 <count module="SqlSelect">
 <param type="query">SELECT COUNT(*) FROM quiz_prog
WHERE subject=@subject AND difficulty=@level AND
unaskable=0</param>
 </count>

<selectq module="SqlSelect">
   <param type="query">
      SELECT top 1 [id] FROM quiz_prog_usage_date
      WHERE subject=@subject AND difficulty=@level AND
unaskable=0
      and [id] not in (select [id] from user_state WHERE
userid=@user and subject=@subject)
      ORDER BY last_used asc
   </param>
 </selectq>
```

FIG. 15C

```
  <source module="Scrambler">
  </source>

<mark_unaskable module="SqlSelect">
    <param type="query">
      UPDATE quiz_prog SET unaskable=1 WHERE
subject=@subject AND difficulty=@level AND id=@id
    </param>
  </mark_unaskable>

<validate module="CodeValidator">
    <param type="query">
      SELECT test_input as input, test_arg1 as arg1,
test_arg2 as arg2, test_arg3 as arg3, test_arg4 as arg4,
test_arg5 as arg5, expected_output
        FROM quiz_prog_qdesc
        WHERE id=@id
    </param>
    <param type="translations">
      csharp=cs
    </param>
  </validate>

<score module="SqlSelect">
    <param type="query">
      SELECT (AVG(CASE WHEN score IS NULL THEN 0.1 ELSE
score END * (0.5 + 0.1 *difficulty)) * 5) as score,
AVG(difficulty) as difficulty FROM user_state
      WHERE userid=@user AND subject=@subject
    </param>
  </score>
</category>
```

US 8,408,912 B2

COMPUTERIZED TESTING SYSTEM FOR EVALUATING SKILLS OF FORMATTED PRODUCT PRODUCERS AND METHODS USEFUL IN CONJUNCTION THEREWITH

REFERENCE TO CO-PENDING APPLICATIONS

Applicant does not have co-pending applications pertaining to the above subject matter.

FIELD OF THE INVENTION

The present invention relates generally to computerized testing systems and more particularly to computerized testing systems for occupational skills.

BACKGROUND OF THE INVENTION

Various types of computerized occupational testing systems are known.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide an online computerized quiz which tracks and quantifies a user's behavior responsive to the quiz. The tracked user behavior may include free-style, natural language (e.g. English) responses to posed questions. Quizzes may test any suitable skill, from ability to program in a particular programming language, to singing.

There is thus provided, in accordance with at least one embodiment of the present invention, a computerized testing system for evaluating skills of formatted product producers, the system comprising a buggy formatted product generator operative to introduce at least one formatting mistake into a formatted product thereby to generate a buggy formatted product and to generate and display on a computer screen to an applicant user, a representation of the buggy formatted product; a debugging interface operative to provide a platform enabling the applicant user to attempt to correct the at least one formatting mistake; and an applicant user monitor operative to monitor the debugging interface and to provide to an applicant evaluating user, at least one output characterizing the applicant's attempt to correct at least one formatting mistake.

Further in accordance with at least one embodiment of the present invention, the formatted product comprises at least a portion of a computer program in at least one individual programming language, the formatting mistake comprises a bug, and the applicant user comprises a programmer for the individual programming language.

Still further in accordance with at least one embodiment of the present invention, the output includes at least one compilation result obtained by compiling code generated by the applicant in an attempt to eliminate the bug.

Further in accordance with at least one embodiment of the present invention, at least a portion of the output is derived from at least one keystroke sequence captured from the applicant in the course of an attempt to correct at least one formatting mistake.

Additionally in accordance with at least one embodiment of the present invention, the output comprises at least one indication of time expenditure characterizing the applicant's efforts to correct at least one formatting mistake.

Further in accordance with at least one embodiment of the present invention, the indication of time expenditure comprises a total amount of time expended by the applicant in correcting the at least one formatting mistake.

Still further in accordance with at least one embodiment of the present invention, the portion of the output includes an indication of any attempt by the applicant user to resort to use of predefined bases of knowledge networked to the debugging interface.

Further in accordance with at least one embodiment of the present invention, the output comprises a total distance traversed by a mouse employed by the applicant user from the time a question or task was presented to the applicant user and until the time at which the question was answered or the task completed by the applicant user.

Still further in accordance with at least one embodiment of the present invention, the buggy formatted product generator comprises a scrambler operative to scramble a portion of a correctly formatted product so as to introduce at least one formatting mistake.

Additionally in accordance with at least one embodiment of the present invention, the scrambler is operative to scramble operative computer code for performing a defined task into non-operative computer code and includes a replaceable snippet detector operative to use at least one regular expression to detect at least one replaceable code snippet in the operative computer code, at least one stored set of possible replacement snippets, each the set including member snippets, wherein any member snippet in the set can replace the replaceable code snippet; and a snippet replacer operative to replace the replaceable snippet with an individual member snippet out of the set of possible replacement snippets corresponding to the replaceable snippet.

Further in accordance with at least one embodiment of the present invention, the d snippet replacer is operative to replace the d replaceable snippet with a member snippet randomly selected from the set of possible replacement snippets corresponding to the replaceable snippet.

Still further in accordance with at least one embodiment of the present invention, the non-operative computer code is invalid for the task.

Additionally in accordance with at least one embodiment of the present invention, the non-operative computer code is erroneous.

Further in accordance with at least one embodiment of the present invention, the output includes a comparison of an output of running code, generated by the applicant in an attempt to eliminate the bug, on given input, to an expected output of the portion of the computer program assuming the same given input.

Further in accordance with at least one embodiment of the present invention, the compilation result includes an indication of a total number of warnings generated by the compiling.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

Certain embodiments of the present invention are illustrated in the following drawings:

FIG. 5 is a simplified pictorial illustration of a computer display screen used to display a quiz question to an applicant user in accordance with certain embodiments of the present invention.

FIG. 6 is a simplified pictorial illustration of a computer display screen on which an applicant user has correctly responded to a quiz question, the screen display being provided in accordance with certain embodiments of the present invention.

FIGS. 7A-7H are tables describing a suitable data structure for certain data storage tables which may be used by the system of FIG. 1, in accordance with certain embodiments of the present invention.

FIGS. 9-13 are tables illustrating example contents of quiz_prog, scrambler_grp_from, scrambler_grp_to, quiz_prog_qdesc and scrambler_assign tables, respectively, following the example work session of FIG. 8.

FIG. 14 is an example of buggy computer code prepared by employing the scrambler of FIG. 1 to scramble operative computer code, in accordance with certain embodiments of the present invention.

FIGS. 15A-15C, taken together, illustrate contents of an example XML file useful for definition of quiz types in accordance with certain embodiments of the present invention.

DETAILED DESCRIPTION OF CERTAIN EMBODIMENTS

Figure 1:
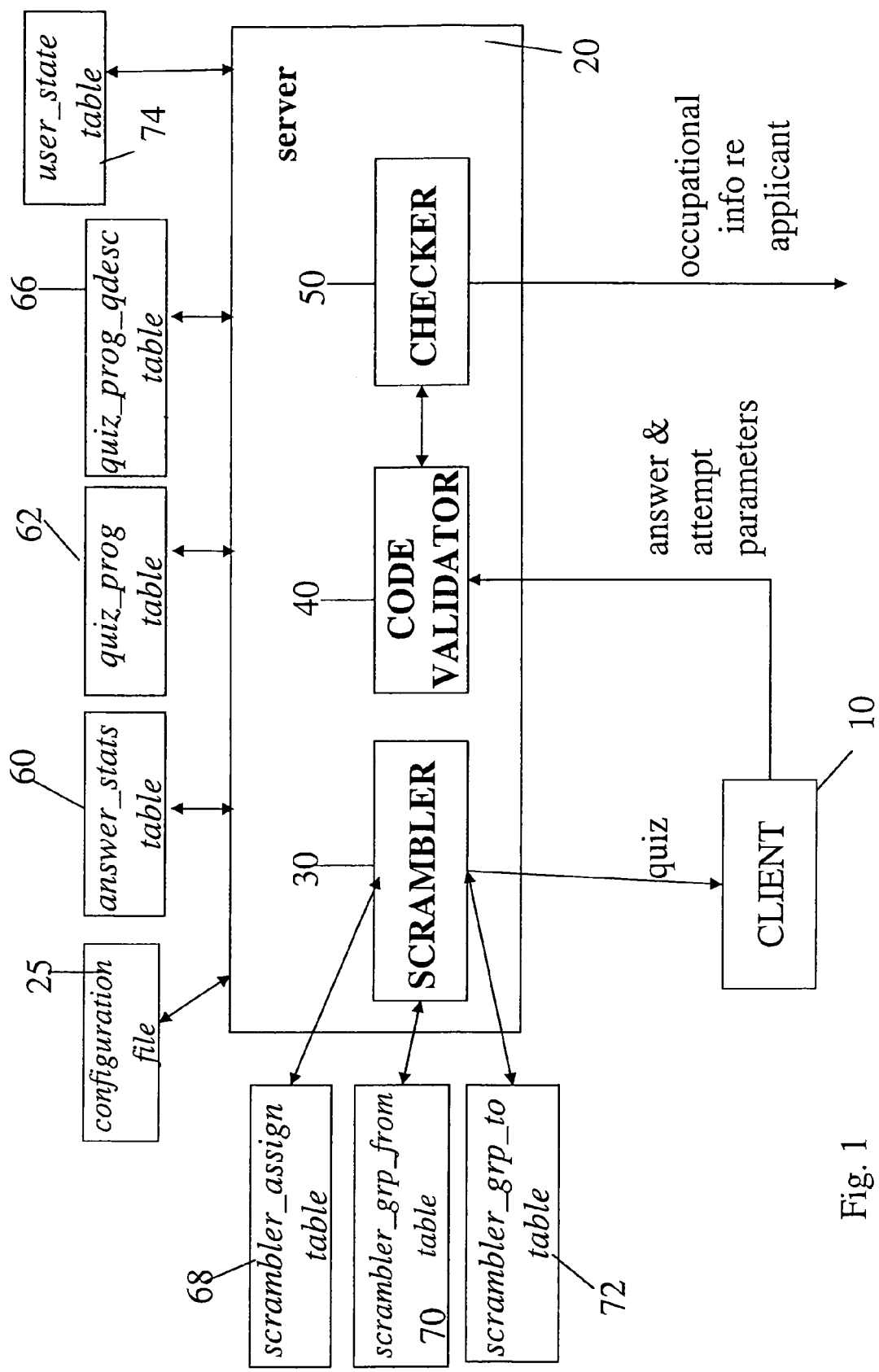
FIG. 1 is a simplified functional block diagram illustration of a computerized human skill testing system constructed and operative in accordance with certain embodiments of the present invention.

Reference is now made to FIG. 1 which is a simplified functional block diagram illustration of a computerized human skill testing system constructed and operative in accordance with certain embodiments of the present invention. The system of FIG. 1 may have a client-server based architecture wherein client 10 and server 20 communicate suitably e.g. over either the HTTP or HTTPS protocols. The client 10, also termed herein "A-Client", may be web-based. A-Client 10 typically prompts the user with a number of questions, be it manually added or automatically generated, prompting the user for an answer. A-client 10 may gather statistics about how well the user answers the question and the user's actions to answer questions and display a grade based on this.

The system of FIG. 1 typically comprises a modular system that enables adding new quiz categories and new processors (called modules). The term "quiz category" defines a type of a quiz such as but not limited to Programming, multiple-choice, and click-on-map type quizzes. A "module" defines a processing unit that can perform an action during each phase of the quiz. The definition of the quiz categories typically resides in xml files, under a Categories folder. An example of xml files is shown in FIGS. 15A-15C. Modules may be defined in visual studio projects and may be registered by adding a registration line of code in the class ModulesRegistrations. A "Subject" is the subject of a quiz, I.e. Java, c++, csharp. The system of FIG. 1 may, for example, use ASP.NET and work under the Microsoft IIS, in the same way as other asp.net applications.

Figure 2:
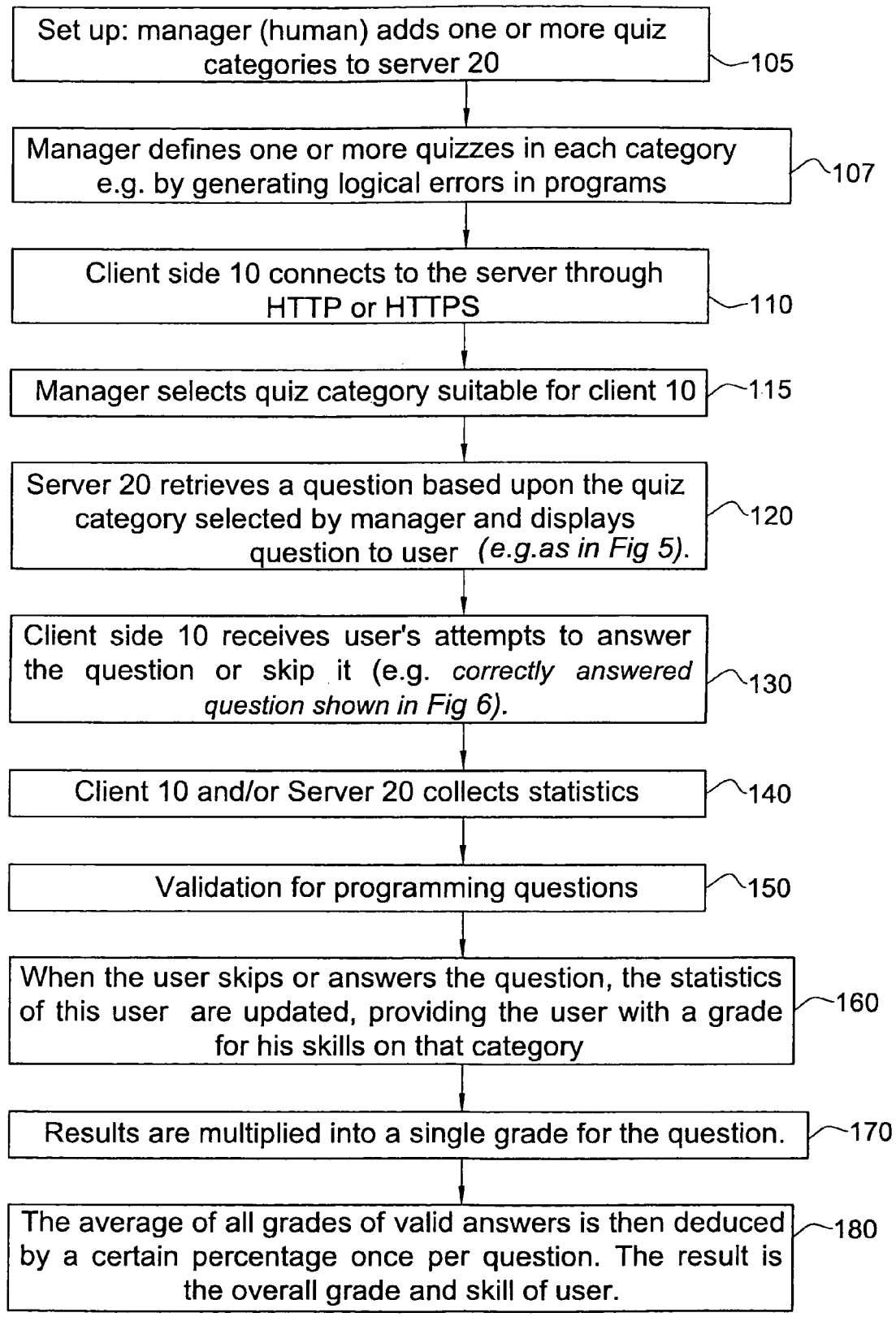
FIG. 2 is a simplified flowchart illustration of a method of operation for the system of FIG. 1, according to certain embodiments of the present invention.
Figure 3:
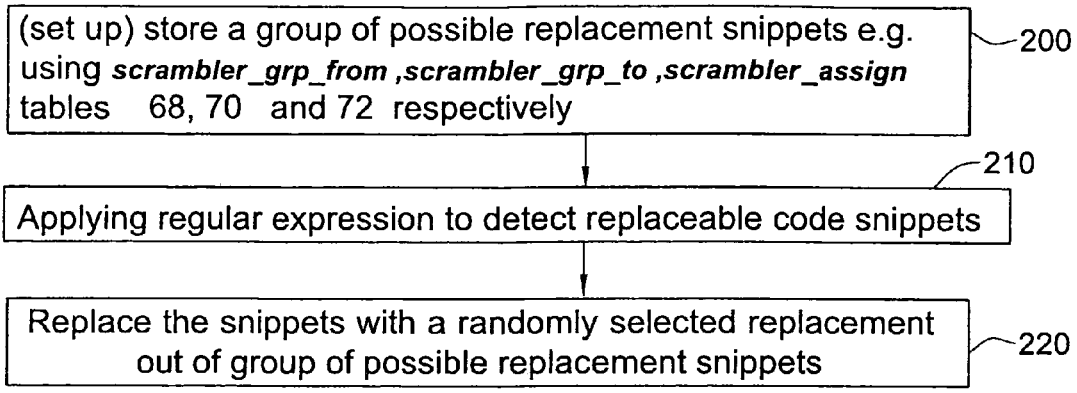
FIG. 3 is a simplified flowchart illustration of a method for performing the scrambling step in FIG. 2, constructed and operative in accordance with certain embodiments of the present invention.
Figure 4:
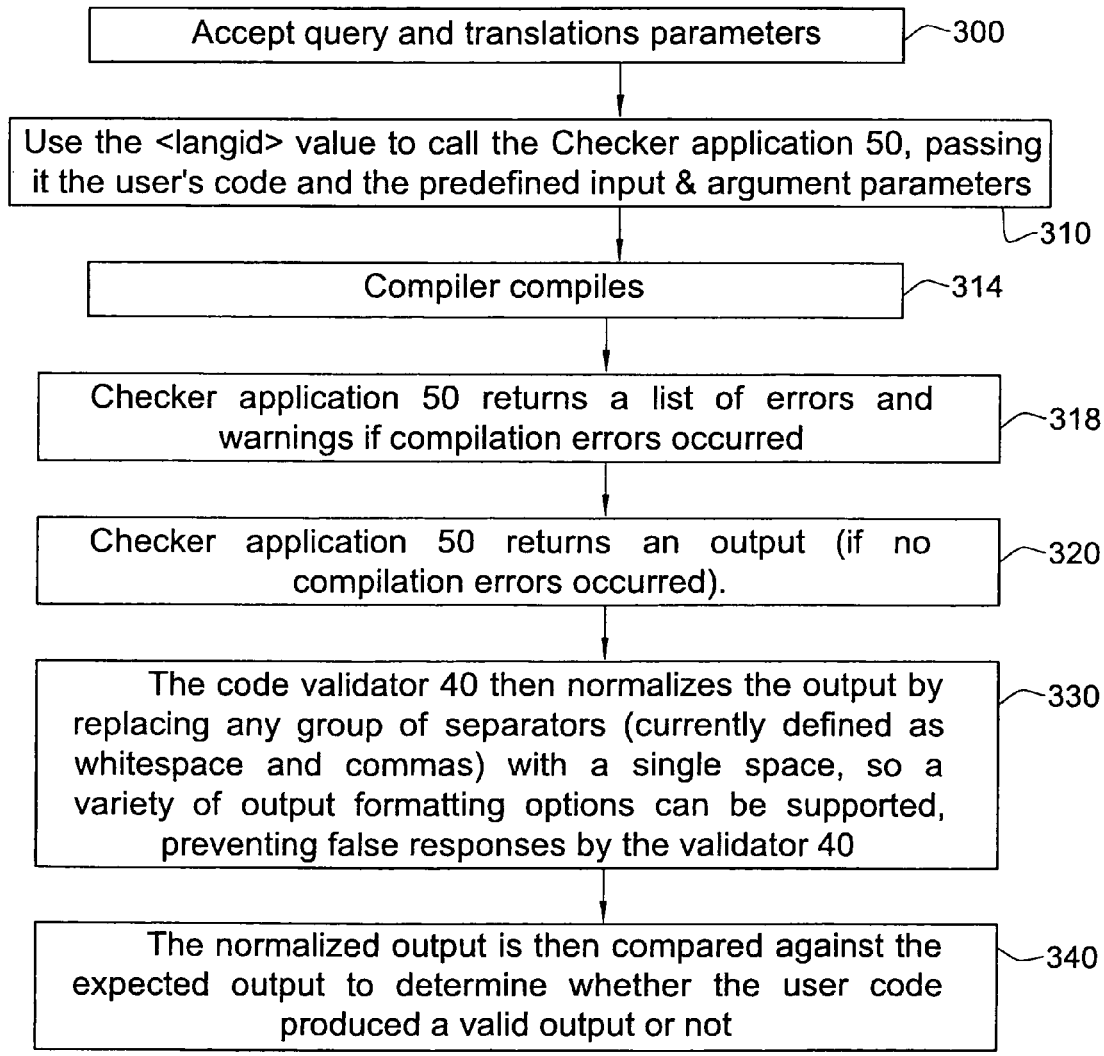
FIG. 4 is a simplified flowchart illustration of a method for performing the validation step in FIG. 2, constructed and operative in accordance with certain embodiments of the present invention.

FIG. 2 is a simplified flowchart illustration of a method of operation for the system of FIG. 1, according to certain embodiments of the present invention. FIG. 3 is a simplified flowchart illustration of a method for performing scrambling step 107 in FIG. 2. FIG. 4 is a simplified flowchart illustration of a method for performing validation step 150 in FIG. 2. FIGS. 2-4 are described in detail below.

One embodiment of Client 10 of FIG. 1 is now described in detail. The client side application 10 may comprise a web-based Net application which connects to the server, A-Serve, through HTTP or HTTPS to retrieve a question based upon the type of quiz that has been selected. The question may be displayed to the user e.g. as shown in FIG. 5, and the user can then skip the question or answer the question correctly, as shown in the example of FIG. 6, or incorrectly. While the user attempts to answer a question, several statistics may be gathered by both A-Client 10 and A-Serve 20 on how the user performs the task, e.g. by keeping track of one, some or all of the following statistics:

The time it takes before the user submits a valid answer
The time before the user starts typing
The number of invalid answers the user submitted
The number of compiler warnings
The number of compiler errors
The typing speed of the user.
The number of backspaces the user types
The total distance the mouse moved from the time a question or task was presented to the time at which the question was answered or the task completed.

One embodiment of A-Serve 20 of FIG. 1 is now described. This server side application can run on either an HTTP or HTTPS server. A-Serve 20 may include a customizable framework for adding new categories of quizzes. The type of the quiz may be defined inside a configuration file 25 e.g. as shown in FIGS. 15A-15C which are merely exemplary and which may be based on an XML file. The configuration file 25 defines widgets on the client application showing the questions, the source to retrieve the set of questions from and the way validator 40 in A-Serve 20 is to validate the answers. Programming questions may for example be retrieved from either a database of questions such as table quiz_prog 64 of FIG. 1, which have been manually added, or, optionally, a program, A-Obsc, that automatically generates questions based upon a database on valid source code. "Not programming" questions can be retrieved from database only, e.g. quiz_mc and quiz_prog tables 62 and 64, which have been added manually only.

The retrieved source code may be then randomly scrambled by scrambler 30 of FIG. 1; tokens may be replaced or removed or function names or arguments may be swapped. Syntax error s can be generated this way, but most logical errors have to be generated manually and hence require human interaction according to some but not all embodiments of the present invention.

Validation for programming questions, performed by code validator 40, may include compiling the application and running it inside a controlled environment for security reasons as described below. Then, test data may be provided as the input for the program and its output may be tested against the expected output as described below.

When the user skips or answer the question, the statistics of this user may be updated, providing the user with a grade for his skills on that category. This may be based on the statistics gathered by A-Client 10, combined with information gathered by A-Serve 20. These gathered statistics may be fed into a customizable formula, e.g. Formula I below, based on the quiz category's configuration file. The customizable formula typically starts at 1, for the best result, and descends to some minimum value.

The results generated by use of formula I (e.g.) may be then multiplied into a single grade for the question. The average of all grades of valid answers may be then deduced by a certain percentage once per question. The result may be the overall grade and skill of user.

An example of a suitable formula is the following Formula I:

$$f(x) = \frac{-(1-c_y)\arctan\left(\frac{X-c_x{^n}}{S}\right)}{\frac{1}{2}\pi} + c_y{^n}$$

In Formula I, x indicates how well the user did, where 0 is perfect and values higher than 0 are progressively worse. The variable may measure anything such as but not limited to number of seconds, number of key presses. The constants need to be defined based upon what this value may be. The constants $C_x$, $C_y$ and S are used respectively to define the center of the drop in score and the speed of the score drop, where a large S means a steeper drop.

For each subject, the scores may be multiplied, which result in a grade for that assignment in the range 0-1. Given a set Q of all scores of all solved questions, t, the number of skipped questions, and p, the fraction of the penalty for a skipped question, the total score may be computed as per the following Formula II:

$$T(Q,t,p) = (\Pi Q)(1-p)^t$$

Scrambler 30 may be used to scramble a given piece of source code into an invalid or erroneous piece of source code. This may be performed by applying regular expression to detect replaceable code snippets and the replacing them with a random replacement out of a group of possible replacement snippets, e.g. using scrambler_grp_from, scrambler_grp_to, scrambler_assign tables 68, 70 and 72 of FIG. 1.

CodeValidator 40 may be used to validate the code submitted by the user, also termed herein the "user code". The code validator typically employs the following 2 parameters:

(a) query parameter—the sql server query used to extract the expected output and the input and arguments to be used for testing the code; and (b) Translations parameter—a list of lines representing subject to compiler language code translations. Each line has the form <subject>=<langid> (i.e. csharp=cs), where <langid> is a programming language id recognized by the Checker application.

The code validator used the <langid> value to call the Checker 50, passing on to it the user's code and the predefined input & argument parameters. The Checker 50 returns a list of errors, warnings and possibly an output (if no compilation errors occurred). The code validator 40 then normalizes the output by replacing any group of separators (currently defined as whitespace and commas) with a single space. This is done so a variety of output formatting can be supported, preventing false responses by the validator 40. The normalized output may be then compared against the expected output to determine whether or not the user code produced a valid output.

The Checker 50 may comprise an external, LINUX based application and may serve as a compilation and execution server for the code users submit as a response to a programming quiz. The code may be compiled by an appropriate compiler (not shown) and then (if compilation is successful) executed in order to receive an output. The output can then be compared to the expected output in order to confirm the code's validity. This component uses advanced LINUX security techniques to enable executing of user submitted code in a secure environment. In embodiments focused on Programming language quizzes, existing, language-specific compilers may be used such as, for example, a conventional c# compiler). For embodiments focused on non-programming language testing, a specially designed compiler may be used which analyzes line by line, using regular expression, in order to determine if the answer is correct.

A suitable database structure for the system of FIG. 1 is now described. The database structure typically includes tables 60-74 of FIG. 1. Answer_state table 60, as shown in FIG. 7A, stores all statistical data regarding user's answers. Quiz_mc table 62, as shown in FIG. 7B, stores question-related data. quiz_prog table 64, as shown in FIG. 7C, stores actual question wordings.

Quiz_prog_qdesc table 66, as shown in FIG. 7D, stores question descriptions. Scrambler_assign Table 68, as shown in FIG. 7E, also stores question description information. Scrambler_grp_from table 70, as shown in FIG. 7F, stores a Scramblers rule type list (what to break or change). Scrambler_grp_to table 72, as shown in FIG. 7G, stores Replacement for rules from scrambler_grp_from. User_state table 74, as shown in FIG. 7H, stores information regarding a User's current state and activity.

Figure 8:
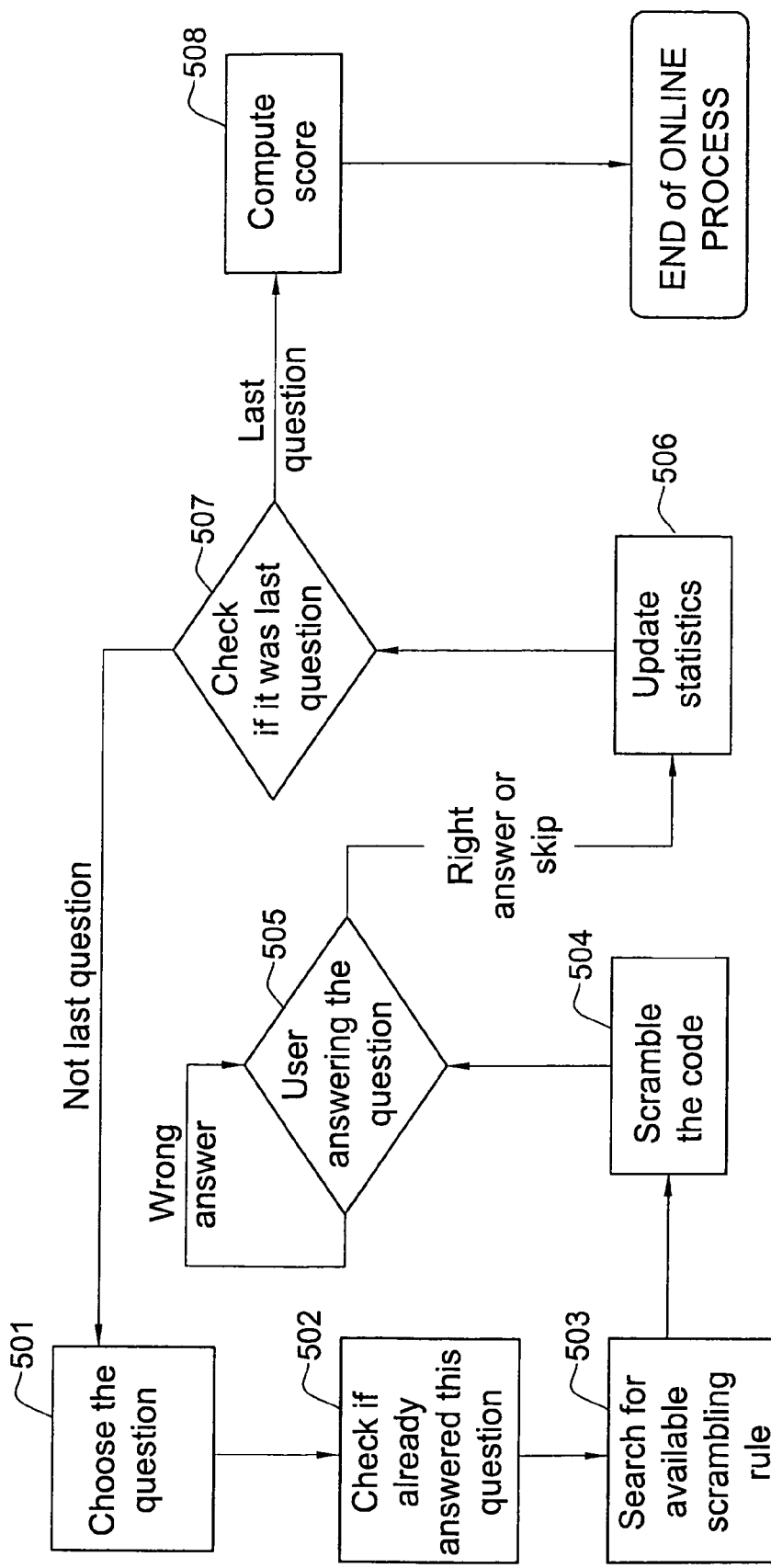
FIG. 8 is a diagram illustrating an example work session using the system of FIG. 1, in accordance with certain embodiments of the present invention.

One embodiment of a work session using the system of FIG. 1 is now described, with reference to FIG. 8. In operation 501, the application receives user identification and difficulty. In operation 502, the answer_stats table 60 may be checked to determine if user already has been asked for such question and what scrambling parameters were used. In operation 503, a search may be conducted for scrambling rules available for this subject, e.g. using scrambler_grp_from and scrambler_grp_to tables 70 and 72, and a scrambler parameter may be chosen, for example: "change one of "<>==" to "<>==" maximum 2 times", or: "replace "for" with "while" maximum 1 time", or: "remove "{ }(;" maximum 3 times) ". In operation 502, the code may be changed and displayed to the user, e.g. as shown in the screenshot of FIG. 5. In operation 505, a User tries to solve the question and clicks a "Compile" button. The application takes the code and sends it to a suitable compiler. Compiler first compiles the code (line by line) and checks for syntax errors. In embodiments which, in contrast to the illustrated embodiment, are not based on programming language tests, this step may be omitted. In operation 506, if the result is out of the area of right questions it updates the user_status table 74 to show the error/warning and allows the user to continue trying to solve the task. In operation 507, if the result is ok, the application updates statistics accordingly. If this was the last question, the score may be computed according to a suitable formula such as Formulae I and II described above.

A detailed example of a work session of the type shown in FIG. 8 is now described in detail with reference to FIGS. 9-14. In the Example, certain content is assumed to reside in the tables of FIG. 1. In particular, the assumed contents of quiz_prog, scrambler_grp_from, scrambler_grp_to, quiz_prog_qdesc and scrambler_assign tables 64, 70, 72, 66 and 68 respectively, are shown in FIGS. 9-13 respectively. The user sees the code shown in FIG. 14, from which it is apparent that the scrambler 30 has changed the "greater than" symbol in the following: for (int i>1 and also in the following: i<>100.

The User fixes, or does not fix, the above bug, and the application shows the user's score accordingly.

The methods of FIGS. 2-4 are now described in detail. The method of FIG. 2 typically includes some or all of the following steps, suitably ordered e.g. as shown:

Step 105: set up: manager (human) adds one or more quiz categories to server 20.

Step 107: manager defines one or more quizzes in each category e.g. by generating logical errors in programs. Alternatively or in addition, a software program may be provided which automatically generates questions including scrambling source code, replacement or removal of tokens; swapping of function names or arguments or otherwise introducing syntax errors Step 110: client side 10 connects to the server through HTTP or HTTPS.

Step 115: Manager selects quiz category suitable for client 10.

Step 120: server 20 retrieves a question based upon the quiz category selected by manager and displays question to user, e.g. as shown in the screenshot illustration of FIG. 5.

Step 130: client side 10 receives user's attempts to answer the question, e.g. the correct attempt shown in FIG. 6, or to skip it.

Step 140: client 10 and/or Server 20 collect statistics such as but not limited to one or more of the following statistics: The time required for the user to submit a valid answer; The time before the user starts typing; The number of invalid answers the user submitted; The number of compiler warnings a user accumulates; The number of compiler errors a user accumulates; The typing speed of the user; The number of backspaces the user types, and the distance the mouse moved while answering the question.

Step 150: Validation for programming questions, typically including compiling the application and running it inside a controlled environment, providing test data and expected output as input for the program and testing actual output against expected output.

Step 160: When the user skips or answer the question, the statistics of this user may be updated, providing the user with a grade for his skills on that category. Step 160 may be based on the statistics gathered by Client 10, combined with information gathered by Server 20. These gathered statistics may be fed into a customizable formula, based on the quiz category's configuration file 25.

Step 170: results may be multiplied into a single grade for the question.

Step 180: The average of all grades of valid answers may be then deduced by a certain percentage once per question. The result may be the overall grade and skill of user.

FIG. 3 is a simplified flowchart illustration of a method for performing scrambling step 107 in FIG. 2. The method of FIG. 3 typically includes some or all of the following steps, suitably ordered e.g. as shown:

Step 200: (set up) store a group of possible replacement snippets e.g. using scrambler_grp_from, scrambler_grp_to, scrambler_assign tables 68, 70 and 72 respectively.

Step 210: applying regular expression to detect replaceable code snippets

Step 220: replacing the replaceable snippets with a randomly selected replacement out of group of possible replacement snippets.

FIG. 4 is a simplified flowchart illustration of a method for performing validation step 150 in FIG. 2. The method of FIG. 4 typically includes some or all of the following steps, suitably ordered e.g. as shown:

Step 300: accept query and translations parameters. The "query" parameter comprises the sql server query used to extract the expected output and the input and arguments to be used for testing the code. The "Translations parameter comprises a list of lines representing subject to compiler language code translations. Each line has the form <subject>=<langid> (i.e. csharp=cs), where <langid> is a programming language id recognized by the Checker application.

Step 310: use the <langid> value to call the Checker application 50, passing on to it the user's code and the predefined input & argument parameters.

Step 314: compiler compiles.

Step 318: Checker application 50 returns a list of errors and warnings if compilation errors occurred.

Step 320: Checker application 50 returns an output (if no compilation errors occurred).

Step 330: The code validator 40 then normalizes the output by replacing any group of separators (currently defined as whitespace and commas) with a single space, so a variety of output formatting options can be supported, preventing false responses by the validator 40.

Step 340: The normalized output may be then compared against the expected output to determine whether the user code produced a valid output or not.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery.

The invention claimed is:

1. A computerized testing system for evaluating skills of formatted product producers, the system comprising:
    a processor configured to act as a buggy formatted product generator operative to introduce at least one formatting mistake into a formatted product thereby to generate a buggy formatted product and to generate and display on a computer screen to an applicant user, a representation of the buggy formatted product;
    a debugging interface operative to provide a platform enabling the applicant user to attempt to correct the at least one formatting mistake; and
    an applicant user monitor operative to monitor the debugging interface and to provide to an applicant evaluating user, at least one output of the monitor characterizing the applicant's attempt to correct at least one formatting mistake, wherein said output comprises a total distance traversed by a mouse employed by the applicant user from the time a question or task was presented to the applicant user and until the time at which the question was answered or the task completed by the applicant user.

2. A system according to claim 1 wherein said formatted product comprises at least a portion of a computer program in at least one individual programming language, said formatting mistake comprises a bug, and the applicant user comprises a programmer for said individual programming language.

3. A system according to claim 2 wherein said output includes a comparison of an output of running code, generated by the applicant in an attempt to eliminate said bug, on given input, to an expected output of said portion of said computer program assuming the same given input.

4. A system according to claim 2 wherein said output includes at least one compilation result obtained by compiling code generated by the applicant in an attempt to eliminate said bug.

5. A system according to claim 4 wherein said compilation result includes an indication of a total number of warnings generated by said compiling.

6. A system according to claim 1 wherein at least a portion of said output is derived from at least one keystroke sequence captured from said applicant in the course of an attempt to correct at least one formatting mistake, 7. A system according to claim 6 wherein said portion of said output includes an indication of any attempt by the applicant user to resort to use of predefined bases of knowledge networked to said debugging interface.

8. A system according to claim 1 wherein said output comprises at least one indication of time expenditure characterizing said applicant's efforts to correct at least one formatting mistake.

9. A system according to claim 8 wherein said indication of time expenditure comprises a total amount of time expended by said applicant in correcting said at least one formatting mistake.

10. A system according to claim 1 wherein said buggy formatted product generator comprises a scrambler operative to scramble a portion of a correctly formatted product so as to introduce at least one formatting mistake.

11. A system according to claim 10 wherein said scrambler is operative to scramble operative computer code for performing a defined task into non-operative computer code and includes:
   a replaceable snippet detector operative to use at least one regular expression to detect at least one replaceable code snippet in said operative computer code;
   at least one stored set of possible replacement snippets, each said set including member snippets, wherein any member snippet in said set can replace said replaceable code snippet; and
   a snippet replacer operative to replace said replaceable snippet with an individual member snippet out of the set of possible replacement snippets corresponding to said replaceable snippet.

12. A system according to claim 11 wherein said snippet replacer is operative to replace said replaceable snippet with a member snippet randomly selected from the set of possible replacement snippets corresponding to said replaceable snippet.

13. A system according to claim 11 wherein said non-operative computer code is invalid for said task, 14. A system according to claim 11 wherein said non-operative computer code is erroneous.

15. A computerized testing method for evaluating skills of formatted product producers, the method comprising:
   introducing at least one formatting mistake using a processor that acts as a buggy formatted product generator into a formatted product thereby to generate a buggy formatted product and to generate and display on a computer screen to an applicant user, a representation of the buggy formatted product;
   providing a debugging interface operative as a platform enabling the applicant user to attempt to correct the at least one formatting mistake; and
   monitoring the debugging interface and providing to an applicant evaluating user at least one output characterizing the applicant's attempt to correct at least one formatting mistake, wherein said output comprises a total distance traversed by a mouse employed by the applicant user from the time a question or task was presented to the applicant user and until the time at which the question was answered or the task completed by the applicant user.

16. A method according to claim 15 wherein said formatted product comprises at least a portion of a computer program in at least one individual programming language, said formatting mistake comprises a bug, and the applicant user comprises a programmer for said individual programming language.

17. A method according to claim 15 wherein at least a portion of said output is derived from at least one keystroke sequence captured from said applicant in the course of an attempt to correct at least one formatting mistake.

18. A method according to claim 15 wherein said output comprises at least one indication of time expenditure characterizing said applicant's efforts to correct at least one formatting mistake.

19. A computer program product, comprising a non-transitory computer usable medium having a computer readable program code embodied therein, said computer readable program code adapted to be executed to implement a computerized testing method for evaluating skills of formatted product producers, the method comprising:
   introducing at least one formatting mistake into a formatted product thereby to generate a buggy formatted product and to generate and display on a computer screen to an applicant user, a representation of the buggy formatted product;
   providing a debugging interface operative as a platform enabling the applicant user to attempt to correct the at least one formatting mistake; and
   monitoring the debugging interface and providing to an applicant evaluating user at least one output characterizing the applicant's attempt to correct at least one formatting mistake, wherein said output comprises a total distance traversed by a mouse employed by the applicant user from the time a question or task was presented to the applicant user and until the time at which the question was answered or the task completed by the applicant user.

* * * * *